Figure 1:
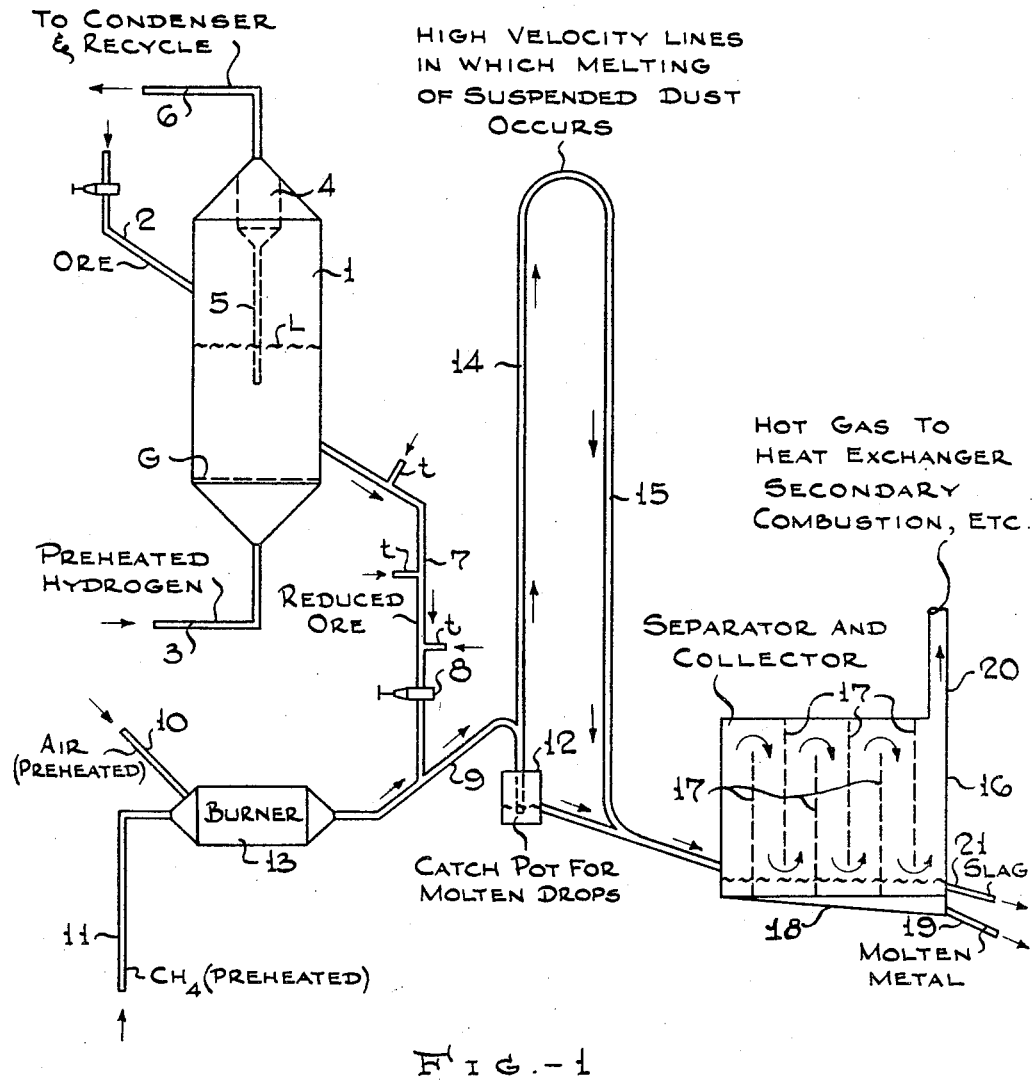
Figure 2:
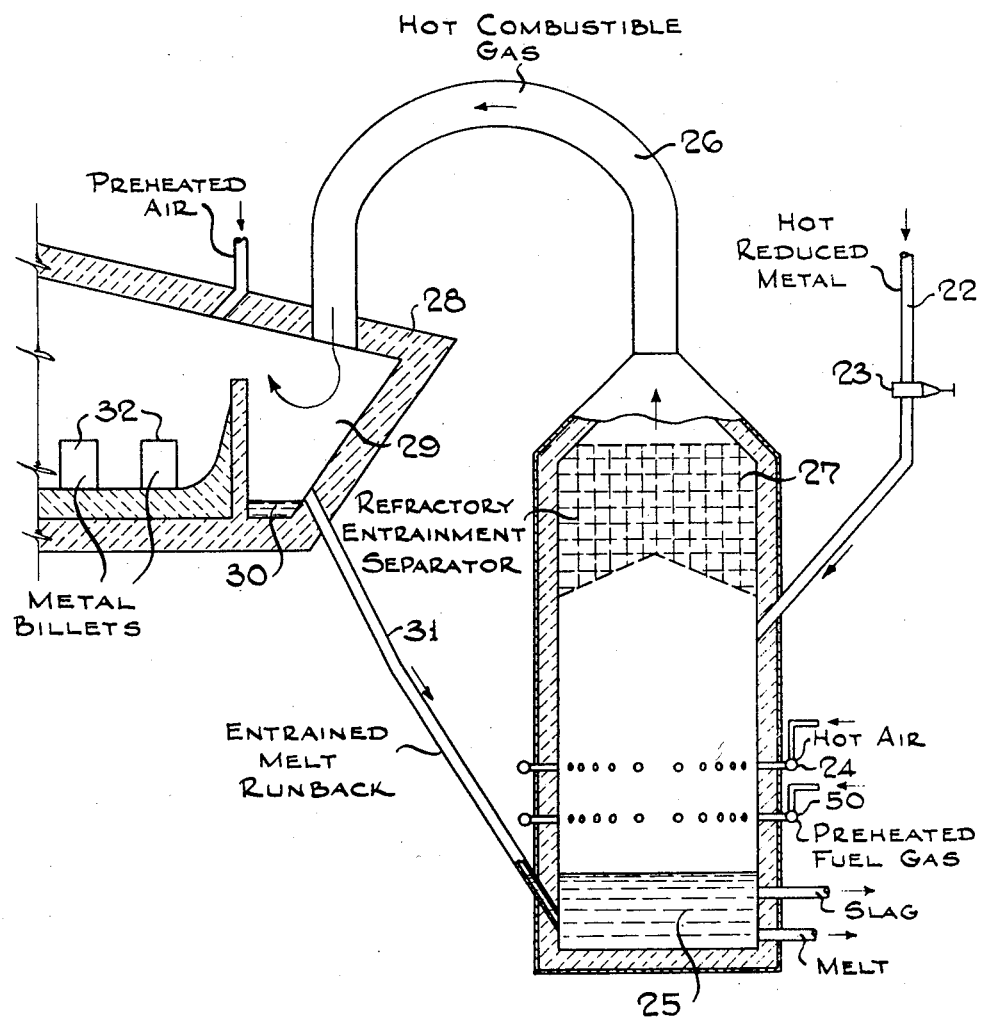

Feb. 6, 1951   H. J. OGORZALY   2,540,593
METHOD OF MELTING REDUCED METAL DUST
Filed Dec. 11, 1947   3 Sheets-Sheet 1

Henry J. Ogorzaly Inventor
By J. Cashman Attorney

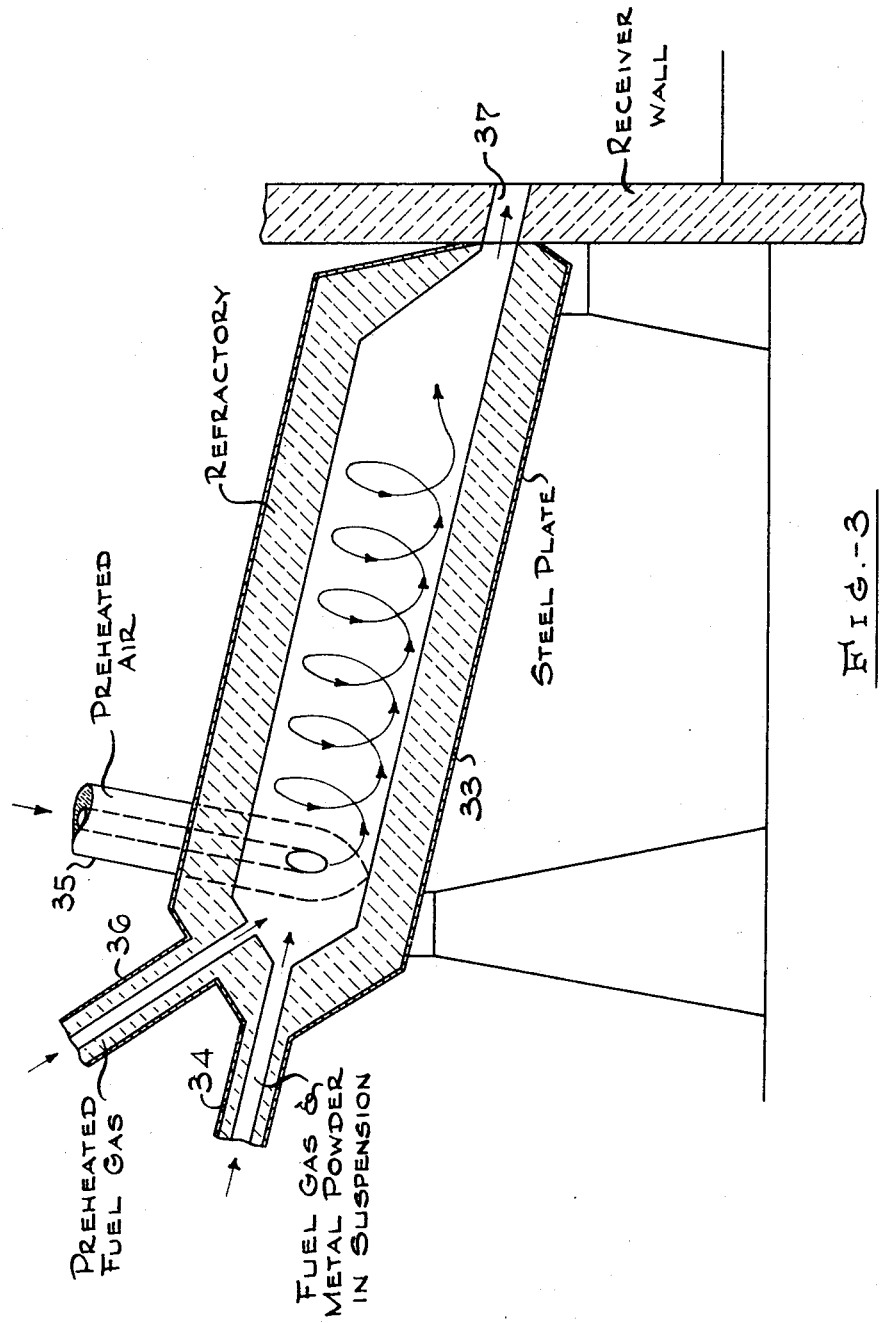

Patented Feb. 6, 1951

2,540,593

UNITED STATES PATENT OFFICE 2,540,593

METHOD OF MELTING REDUCED METAL DUST

Henry J. Ogorzaly, Summit, N. J., assignor to Standard Oil Development Company, a corporation of Delaware Application December 11, 1947, Serial No. 791,113

4 Claims. (Cl. 75—38)

My present invention relates to a continuous method of melting finely divided solid particles in controlled atmospheres. It has particular application to the melting of particulate sponge iron, that is, iron which has been produced from finely divided ore particles by reduction at temperatures below the fusion point of the reduced metal. However, my invention has many other applications both with regard to the melting of other metals than iron and of many compounds of metallurgical interest such as certain oxides, sulfides, etc. A particular example of a process to which my invention is adapted involving the melting of compounds of metallurgical significance is the melting of copper sulfide-nickel sulfide ore in the presence of sodium sulfide, to effect a separation of molten gangue materials from the metal-bearing portion of the melt, and of the nickel sulfide and copper sulfide portions of the melt from each other.

The development of continuous melting processes for powdered solids has presented certain difficulties. Among these is the fact that finely divided materials at elevated temperatures are very reactive and consequently the atmosphere in which the melting takes place must be carefully controlled to avoid undesired changes in chemical composition. Frequently, in the art, when small particle sizes are involved and a burning fuel is in contact with the melting solids, excessive loss of material by entrainment in the combustion fumes occurs because of excessive gas velocities; also undesired reactions such as oxidation convert the molten product into a solid form, or excessively low temperatures in portions of the apparatus permit the freezing of molten droplets into solid particles of extremely fine size, which are additional defects of the prior art. All these difficulties result from an inadequate appreciation of the problem. On the other hand, in any indirectly heated melting zone, the low rate of heat conduction through layers of powder has greatly limited the rate of melting. Most attempts to melt powder or even lump solids in a continuous process, such as inclined rotating kilns, have been seriously impaired by the tendency of the solid to pass through a phase of extreme stickiness when the temperature has reached a level such that the mass became plastic, through the formation of large masses adhering to the walls of the kiln which hampered the flow of the solid material.

I have now devised a process for melting which takes advantage of the properties of finely divided solids, and, in brief, my process involves the following procedure.

In my process, I charge finely divided solids continuously into a zone through which a stream of hot gas is passed, the composition of the gases being so regulated as to maintain these gases in chemical equilibrium with respect to the said solids, and the temperature of the gas being maintained above the melting point of the said solids. By the words "chemical equilibrium" or "composition equilibrium," as herein used, reference is had to the fact that the said solids do not undergo a chemical reaction in the process. These gases may be, for instance, the products of combustion with air, or other oxidizing gas, of methane, ethane, natural gas, normally liquid petroleum hydrocarbons, coke, or solid carbonaceous materials such as lignite, and they may also contain in some cases sulfur-carrying gases such as sulfur dioxide and hydrogen sulfide. Due to the fact that the solid particles are of small size and the further fact that they are suspended in the form of individual particles in the gaseous medium, the transfer of heat to the solid particles is extremely rapid. As a consequence, the dust particles rapidly absorb from the gas a sufficient amount of heat to melt them. This melting occurs in a short interval of time, virtually immediately, or in a matter of a small fraction of a second. As a result, the hot solid passes through the plastic to the molten stage with extreme rapidity and substantial adherence of a plastic deposit to the walls of the melting vessel is thus prevented. A further contributing factor which prevents the accumulation of substantial plastic deposits on the walls is the fact that the temperature throughout the melting vessel is maintained above the melting point of the solid.

The molten droplets thus formed in gaseous suspension are of a high density as is typical of metallic compounds generally. They also tend to grow in size by coalescence, as they collide with one another in the swirling suspension. As a result, they readily settle under the influence of gravitational forces out of gaseous suspension, and may be collected as a pool of molten material.

The main object of my invention, therefore, is to melt finely divided solids in a manner which is more economical and efficient than previous methods.

A specific object of my invention is to melt, in an economical and efficient manner, powdered sponge iron, which may be obtained, for example, by the reduction of iron ore while in the form of a suspension in a reducing gasiform atmosphere maintained at temperatures below the fusion point of the reduced metal.

Another object of my invention is to melt powdered sponge iron in a manner permitting close control of the degree of carburization of the molten metal.

Other and further objects of my invention will appear in the following description and claims.

In the accompanying drawing, I have shown in Figure I, in purely diagrammatic form, and for illustrative purposes only, a form of apparatus in which I may reduce a sub-divided ore while in the form of a bed fluidized by a hydrogen-containing gas, and thereafter melt the reduced ore or metal in suspension in a gaseous medium maintained in chemical or composition equilibrium with the reduced ore, in the manner of my invention; I have shown in Figure II another form of apparatus in which my melting process may be carried out, and means for utilizing the hot gases resulting from the melting operation; and in Figure III, I have shown another modification of an apparatus in which the melting operation may be carried into effect.

Referring in detail to Figure I, the numeral 1 represents a reducing vessel in which finely divided ore is continuously reduced to the metallic state by contact with a gasiform reducing medium. In operating the reducer, ore ground to a particle size capable of forming a dense turbulent suspension in a gaseous medium as, for example, to a particle size of from 5 microns to 10 mesh, is charged continuously to the reducer through line 2, and simultaneously preheated reducing gas preferably containing hydrogen enters the bottom of the reducer through line 3, passes upwardly through a foraminous member G and contacts the ground ore. The ground ore is formed into a dense turbulent suspension by causing the superficial velocity of the upflowing gas to be fixed within the limits of ½ to 3 feet per second. By superficial velocity, I mean the velocity of the gas were there no solids in the reducer. Depending upon the actual amount of solids present in the reactor, the fluidized mass will have an upper dense phase level at L. The gasiform material passes through the fluidized mass into the upper portion of the reducer and in this upper portion of the reducer the concentration of solids in gasiform material sharply reduces upwardly. However, the gases leaving the upper portion of the reducer may contain entrained solids, and to separate these from the gas it is passed through one or more solids separating devices 4 disposed in the upper portion of said reducer. The separated solids are returned by gravity to the dense suspension through dip pipes 5 (one shown). The gasiform material exits from the reducer through line 6. Since the hydrogen of this gasiform material has been partially oxidized, it is cooled to condense water (in equipment not shown), thereafter separated from the water and recycled to line 3 for further use in the process. A portion of the gasiform material may also be vented to remove inert gases such as nitrogen and other oxidation products such as carbon dioxide, and additional hydrogen-containing gas is added to provide the necessary replenishment.

Referring again to the fluidized body of ore undergoing reduction in the reducing gas, the reduction in the case of ferrous ores may be effected at temperatures within the range of 800° to 1300° F. where hydrogen is the reducing gas. Other reducing gases such as methane or carbon monoxide may be employed, and of course the optimum temperature varies with the particular ore undergoing reduction. It should be pointed out that frequently the raw ore is associated with gangue, that is, siliceous or limy impurities. These impurities do not interfere with the reduction of ore per se.

The reduced ore (i. e., metal) is withdrawn from the reducer 1 through line 7, controlled by valve 8, and discharged into a stream of hot gases flowing through line 9. It will be understood, of course, that in order to enhance the flowability of the reduced ore in line 7 slow currents of gasiform material, preferably of a reducing nature, should be introduced at spaced points into said line 7 through gas taps t.

The gas in line 9 is obtained as follows. Preheated air which enters the system through line 10 and a preheated fuel such as methane, natural gas, etc., entering the present system through line 11 are discharged into burner 13 where partial combustion of the fuel occurs to a degree, limited by the air-fuel ratio. Thereafter, the hot combustion products are withdrawn from the burner into line 9. As will be hereinafter more fully explained, the quantities of air and fuel charged to burner 13 are such as to result in the formation of a gas which is non-oxidizing with respect to the metal in molten form. The preheat supplied to the fuel and air streams and the ratio in which the reduced ore is added to the combustion products are such that the resultant temperature of the suspension after reaching temperature equilibrium is above the melting point of iron.

The reduced ore, as stated, is discharged into the gases in line 9 and, due to the temperature of said gases, the said reduced ore is rapidly heated and caused to pass into the molten state. The gas in line 9, carrying the reduced ore, discharges into vertical lines 14 and 15 whose primary function is to permit sufficient contact time for melting of the metal particles to be completed and for the small droplets of molten metal to coalesce into larger particles by collision while suspended in the turbulent gas stream. Such molten metal as is thrown out against the walls of line 14 flows by gravity into a receiving pot 12. The flow of the molten droplets of metal suspended in the gasiform material continues from line 15 into a receiving vessel or collector 16. As indicated in the drawing, the receiving vessel is provided with a plurality of baffles 17 causing the gasiform material to flow along a tortuous path as indicated by the arrows, and the result of this flow is to effect separation of molten metal from the gasiform material. The molten metal descends into a pool 18 and may be recovered through a line 19, while the gasiform material exits through line 20. Whatever slag is associated with the molten metal in pool 18, due to the melting of gangue associated with the ore charged to reducer 1, may be skimmed off according to known manner through line 21.

In lines 9, 14 and 15 a large metal surface in the form of solid particles or molten droplets is in contact at high temperature level with a gas of substantially uniform composition. In addition, a substantial amount of metal surface is swept by the same gas in receiver 16, in which the holding time of the metal may be adjusted at will. Under these conditions, composition equilibria between the gas and the molten metal are closely approached, which is of particular importance in controlling the final degree of deoxidation and carburization within the melt. Under normally efficient conditions for melting, when employing a composition of melting gas which is just short of inducing reoxidation of the metal, essentially no carburization of the molten metal will occur and a substantial saving in subsequent processing to reduce carbon content can thus be effected. If, however, it is desired to introduce small percentages of carbon into the melt, this can be accomplished by suitably reducing the air-fuel ratio, thereby adjusting the composition of the melting gas.

It will be understood that in the interest of efficient operation of the process which I have just described, accessory apparatus (not shown) such as pumps, flow meters, heat exchangers, etc., should be provided. It will also be understood that, since my process involves the processing of a molten metal generally at high temperatures, conduits, receivers and other vessels contacting such molten metal should be constructed of refractory material or lined with material capable of withstanding the high temperatures and reducing atmosphere.

Referring to Figure II, I have shown in detail a melting and collecting vessel depicting a specific form of apparatus in which the process illustrated in Figure I may be practiced. In this modification, the finely divided metal is charged to the melter through line 22, controlled by valve 23. Preheated air is discharged through a manifold 24 into the melting vessel. Similarly, preheated fuel gas such as methane, natural gas, etc., is discharged into the melting vessel through manifold 50, preferably through an entry line so disposed that complete and thorough mixing of the air and fuel gas streams is facilitated. Combustion of the fuel gas with the air proceeds rapidly to a degree consistent with the controlled ratio of air to fuel gas, generating a large amount of heat and resulting in a composition of combustion products which is non-oxidizing relative to the metal in the molten state. The powdered reduced metal introduced through line 22, upon contacting the gas in the melting vessel, is rapidly heated to melting temperatures. Sufficient volume is provided in the upper part of the melter to permit coalescence of many of the small molten droplets to larger drops, and a large part of the molten metal separates by gravity into a pool 25 disposed at the bottom of said melter. The gases pass upwardly through the melting vessel into an exit duct 26. However, since these gases may contain some entrained metal droplets, they are forced through a separator 27, shown disposed at the top of the melter. This separator may have any known form but is preferably constructed of refractory material and separation of entrained droplets is effected by causing the gas passing through said separator to describe a tortuous path, whereupon separation of the entrained material is effected.

While the hot gases leaving the melter through duct 26, which contain a substantial amount of combustibles, may be utilized in any convenient manner to recover their sensible and chemical heat content, in this modification I have indicated a process in which the said gases are discharged into a reheating or soaking furnace 28 containing, say, billets 32, wherein their combustion is completed with additional air, releasing additional heat which may be usefully employed to reheat said billets. At the inlet of the reheating furnace, I have shown a metal separator or trap 29 wherein additional molten metal still entrained in the gases leaving the melter may be separated prior to the addition of the air for completing the combustion, collected in the pool 30, and returned via line 31 to pool 25.

Particularly when operating my melting process on a small scale, so that the melter is a vessel of relatively small diameter of the order of 5 feet or less, I may preferably introduce the air and fuel gas through lines 24 and 50 tangentially in order to produce a cyclonic flow pattern and facilitate the separation of molten metal from the gases in the melter.

In Figure III, I have shown a second modification of a melting and collecting device which Figure II may take. In this modification, the melting occurs in an inclined vessel 33. In this modification, reduced metal suspended in fuel gas enters the melter through line 34 and at the same time air through line 35 and additional fuel gas through line 36 are discharged into the melter 33. The gasiform materials in the melter 33, as in the previous modifications, undergo combustion to a gas of reducing composition and the gases are preferably caused in this modification to define a cyclonic flow pattern. As in the other modifications, the high temperature causes melting of the metal. Introduction of the metal along the axis of the burner, and suspension in fuel gas while the air is introduced tangentially, protects the metal from excessive reoxidation, while permitting utilization of its heat capacity to reduce the temperature level of the combustion. The molten metal is separated in large part against the walls of melter 33 and drains from melter 33 at 37 into a receiving vessel (not shown). The gases and fumes exit also at 37 and any metal entrained in the said fumes may be separated from the fumes by a separating device similar to that shown in Figure II.

I have previously mentioned that surfaces contacting the molten metal should be protected in known manner by highly refractory lining capable of withstanding the reducing conditions present. Specifically for the case of melting iron, magnesite, chrome-magnesite, sillimanite, and flint-type fireclay bricks may be used, while silica bricks in general are not satisfactory. In order further to protect surfaces contacting the molten metal, they may be cooled by a heat exchange fluid such as steam or water, to cause the formation of a protective lining of solidified metal.

In order further to illustrate my invention and describe the best manner in which it may be performed, I now set forth a specific example giving operating conditions suitable for processing iron ore.

A highly purified magnetite ore in subdivided form is subjected to reduction in the presence of reducing gases which form with the ore a dense fluidized turbulent mass in the presence of a gas containing hydrogen. The reduction is effected at a temperature of the general order of 1050° F. The process is operated under about normal atmospheric gas pressure. The average residence time of the ore undergoing reduction is of the order of one hour.

The reduced finely divided sponge metal now at the reduction temperature of 1050° F. is then discharged through a standpipe into a stream of hot natural gas at a temperature of 1000° F. The suspension of powdered sponge iron in natural gas is discharged into a burning and melting vessel fired with additional hot natural gas and air preheated to 1900° F. The composition of the natural gas is approximately 90% methane and 7.5% nitrogen, and 4.4 mols of air are supplied for each mol of natural gas flowing into the combustion and melting zone. With the specified air to fuel ratio, the composition of the product gas, at a final exit temperature of 2900° F., which is substantially above the melting point of pure metallic iron, is as follows:

|  | Mol percent |
|---|---|
| $H_2O$ | 11.6 |
| $H_2$ | 18.0 |
| $CO_2$ | 1.9 |
| $CO$ | 13.3 |
| $N_2$ | 55.2 |
| Total | 100.0 |

Metallic iron is not oxidized or carburized by contact with this gas. At the temperature level of 2900° F., the iron is completely melted and recovered from gaseous suspension as previously described. The requirement of natural gas per ton of iron melted is of the order of 10,000 standard cubic feet, of which a substantial percentage is required to make up for unavoidable heat losses from the system.

It is to be understood that the specific example given above is purely illustrative of my invention and is not limitative thereof. My invention is equally applicable to the melting of sponge metals associated with a high gangue content and to the melting of subdivided metal particles prepared by means other than direct reduction of ground ore. It is also applicable to the melting of any metallic compounds of metallurgical interest where it is desired to effect a change of state without substantial change in chemical composition. While the illustrations and examples given have particular reference to the melting of metals, wherein control of atmosphere is readily established by the sole means of properly proportioning the relative volumes of fuel and oxygen-containing gas fired, it should be readily appreciated that in other cases, as when melting sulfidic compounds, it may be desired to add sulfur vapors or other sulfur-containing gases in order properly to adjust the gas composition and to avoid decomposition of metallic compounds which it is desired only to melt. Furthermore, the specific conditions, proportions of oxygen-containing gas and fuel and the other details of the process will, of course, have to conform to the specific problem presented, but sufficient information has been given herein to enable one skilled in the art to adjust conditions to satisfy the requirements involved in melting any particular subdivided solid.

Numerous modifications of my invention will be apparent to those familiar with this general art without departing from the spirit thereof.

What is claimed is:

1. The continuous method for melting, without significant change in chemical composition, finely divided sponge iron particles produced by reduction of an iron ore at a temperature below the fusion point of the metal, which comprises discharging said reduced sponge iron particles into a confined zone through which is continuously passed a highly heated gasiform material comprising $H_2$, $H_2O$, $CO$ and $CO_2$ so proportioned that the $CO_2$ content of said gasiform material represents less than about 35% of the combined $CO$ and $CO_2$ content and the $H_2O$ content of said gasiform material represents less than 70% of the combined $H_2O$ and $H_2$ content, whereby the said gasiform material is non-oxidizing in respect to the said solid particles, maintaining the temperature level of the resulting mixture of the gasiform material and the initially solid materials above the fusion temperature of said initially solid iron particles whereby fusion of said initially solid iron in gaseous suspension occurs in a relatively short period of time and separating the molten phase formed by such fusion from the gasiform material and concentrating said molten phase into a pool of molten material.

2. Process of claim 1 in which the major proportion of the said highly heated gasiform material results from partial combustion of gaseous fuel with a controlled ratio of oxygen-containing gas in an external combustion zone.

3. Process of claim 1 in which the major proportion of the said highly heated gasiform material results from the partial combustion of gaseous fuel with a controlled ratio of an oxygen-containing gas directly in said confined zone in which said fusion takes place.

4. Process of claim 1 in which the carbon content of the molten iron is substantially below 1.5% carbon.

HENRY J. OGORZALY.

REFERENCES CITED

The following references are of record in the file of this patent:

UNITED STATES PATENTS

| Number | Name | Date |
|---|---|---|
| Re. 20,828 | Powell | Aug. 16, 1938 |
| 729,008 | Sutton | May 26, 1903 |
| 806,774 | Brown | Dec. 12, 1905 |
| 817,414 | Brown | Apr. 10, 1906 |
| 1,160,621 | Klepinger et al. | Nov. 16, 1915 |
| 1,370,915 | Riveroll | Mar. 8, 1921 |
| 1,371,084 | Ferguson | Mar. 8, 1921 |
| 1,915,540 | Krecji | June 27, 1933 |
| 1,964,915 | Haswell et al. | July 3, 1934 |
| 1,988,541 | Christensen | Jan. 22, 1935 |
| 2,038,251 | Vogt | Apr. 21, 1936 |
| 2,131,599 | Shrum | Sept. 27, 1938 |
| 2,186,659 | Vogt | Jan. 9, 1940 |
| 2,295,039 | Hodson et al. | Sept. 8, 1942 |
| 2,300,042 | Caldwell | Oct. 27, 1942 |
| 2,455,907 | Slayter | Dec. 7, 1948 |

FOREIGN PATENTS

| Number | Country | Date |
|---|---|---|
| 457,957 | Great Britain | Dec. 9, 1936 |
| 445,014 | Germany | June 1, 1927 |